United States Patent
Zhang et al.

(10) Patent No.: US 12,068,982 B2
(45) Date of Patent: Aug. 20, 2024

(54) METHOD PERFORMED BY USER EQUIPMENT, AND USER EQUIPMENT

(71) Applicant: SHARP KABUSHIKI KAISHA, Sakai (JP)

(72) Inventors: Chongming Zhang, Shanghai (CN); Renmao Liu, Shanghai (CN); Ningjuan Chang, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 386 days.

(21) Appl. No.: 17/634,155

(22) PCT Filed: Jul. 10, 2020

(86) PCT No.: PCT/CN2020/101296
§ 371 (c)(1),
(2) Date: Feb. 9, 2022

(87) PCT Pub. No.: WO2021/027456
PCT Pub. Date: Feb. 18, 2021

(65) Prior Publication Data
US 2022/0294582 A1    Sep. 15, 2022

(30) Foreign Application Priority Data
Aug. 9, 2019    (CN) .......................... 201910738430.6

(51) Int. Cl.
*H04L 5/00* (2006.01)
*H04B 1/74* (2006.01)
*H04W 72/21* (2023.01)

(52) U.S. Cl.
CPC ............. *H04L 5/0035* (2013.01); *H04B 1/74* (2013.01); *H04L 5/0096* (2013.01); *H04W 72/21* (2023.01)

(58) Field of Classification Search
CPC ........ H04L 5/0035; H04L 5/0096; H04B 1/74
USPC ...................................... 455/452.1
See application file for complete search history.

(56) References Cited

PUBLICATIONS

NTT Docomo, "New SID Proposal: Study on New Radio Access Technology", RP-160671, 3GPP TSG RAN Meeting #71, Göteborg, Sweden, Mar. 7-10, 2016.
Huawei et al., "BFR with SCell deactivation and MAC reset", R2-1808418, 3GPP TSG-RAN WG2 Meeting 102, Busan, Korea, May 21-May 25, 2018.
Asustek, "UE behaviours upon beam failure and recovery", R2-1804279, 3GPP TSG-RAN WG2 Meeting #101bis, Sanya, China, Apr. 16-20, 2018.

*Primary Examiner* — Joel Ajayi
(74) *Attorney, Agent, or Firm* — ScienBiziP, P.C.

(57) ABSTRACT

Provided in the present invention are a method performed by user equipment, and user equipment, which can reliably perform processing related to a beam failure recovery request/beam failure report (BFR) and/or scheduling request (SR). The method comprises: detecting a measurement result of a measurement reference signal corresponding to a serving cell; if the measurement result indicates that a beam failure has occurred, utilizing a counter to count the number of beam failures; and when the count value of the counter is above a given threshold, performing processing related to a beam failure recovery request/beam failure report (BFR) and/or scheduling request (SR).

3 Claims, 1 Drawing Sheet

METHOD PERFORMED BY USER EQUIPMENT, AND USER EQUIPMENT

TECHNICAL FIELD

The present invention relates to the technical field of wireless communications, and in particular to a method performed by user equipment, and user equipment.

BACKGROUND

With the rapid growth of mobile communications and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, at the 3rd Generation Partnership Project (3GPP) RAN #64 plenary meeting held in March 2016, a research subject on new 5G radio access technology was proposed (see non-patent literature: RP-160671 New SID Proposal: Study on New Radio Access Technology). In description of this work project, the working frequency band of the future new communication system can be extended to 100 GHz, which can satisfy at least the requirements of enhanced mobile broadband services, the communication requirements of a large number of sets of UE in the Internet of Things, and the requirements of services requiring high reliability at the same time. The research work on this project ends in 2018.

In the research of this subject, it is planned to transmit information using beams/beam forming, which specifically includes, during communication using high frequencies, transmitting narrower beams to cope with the characteristic of excessively quick fading of channels at high frequencies. However, information transmission using narrower beams is susceptible to external changes, for example, mobile phone rotation or obstruction by other objects.

In a transmission scenario in which beam forming is performed, if a beam failure occurs, the UE will transmit related request information (for example, a beam failure recovery request or a beam failure report) to a network so as to request a reconfiguration or recovery of a valid operating beam. Such request information can be transmitted through a PRACH or a PUCCH.

Beam forming can be used in combination with a carrier aggregation technology, a base station may configure a plurality of carriers for the UE, and different carriers may correspond to different serving cells, including at least one primary cell (Pcell) and one or more secondary cells (Scells). Both the primary cell and the secondary cells may use the beam forming technology. If a beam transmission fails, the failure can be recovered. Theoretically, the primary and secondary cells may adopt the exact same beam failure recovery procedure. In practical application, however, there are certain problems as follows:

The primary cell is always configured with PRACH resources, and the secondary cell is not necessarily configured with PRACH resources. If the secondary cell is not configured with PRACH resources, once a beam failure occurs on the secondary cell, a feasible method is to transmit a beam failure recovery request or a beam failure report on the PUCCH channel of the primary cell, and after the base station receives the request/the report, an uplink resource can be allocated to the UE, and the UE can further provide relevant information for beam recovery on the uplink resource. The UE can generate a BFR MAC CE to report information of the secondary cell where the beam failure occurred, wherein the MAC CE can carry an ID or an index of the cell where the beam failure occurred, as well as information of a best candidate beam determined by the UE, such as a beam index or a beam ID. Then the UE transmits the MAC CE to the base station on the uplink resource assigned by the base station. After the base station receives the MAC CE correctly, the base station can decide what operations to perform.

In order to transmit the beam failure recovery request/beam failure report on the PUCCH channel, a feasible solution is to trigger the UE to perform a beam failure recovery/report procedure when the number of failure instances continuously reported exceeds (is greater than or equal to) a maximum number of reports allowed, and triggering the procedure can be simply referred to as triggering a BFR. This procedure is essentially generating a BFR MAC CE for reporting. When the UE has a triggered BFR, if there is an uplink resource for a new transmission, the UE can instruct a multiplexing and assembling entity to generate a BFR MAC CE and perform transmission on the resource; if there is no available uplink resource, then a scheduling request can be triggered.

When a scheduling request is triggered by a BFR, if there is a PUCCH configuration or scheduling request resource configuration corresponding to the scheduling request, the UE can instruct a physical layer to transmit the scheduling request (signalling a Scheduling Request, SR) on a valid PUCCH resource.

Since the SCell is not always in a working state, the SCell entering a non-working state from the working state is referred to as deactivation, and on the other hand, the SCell entering the working state from the non-working state is referred to as activation. When the Scell is deactivated, how to deal with the triggered BFR and the triggered SR is a problem that needs to be solved.

In addition, from the time the UE first triggers a BFR to the time a network side response is received, there may be a plurality of BFRs triggered on the same Scell, and these triggered BFRs may cause BFR MAC CEs for the same Scell to be transmitted, or SRs for the same Scell to be transmitted, thereby wasting resources. In order to avoid the above situations, a solution needs to be provided.

In addition, when the UE waits, on an SCell where a failure has occurred, for a response transmitted by the base station, a BWP handover may occur, thereby resulting in the UE not being able to correctly receive the response transmitted by the base station, which is also a problem that needs to be solved.

SUMMARY OF INVENTION

The object of the present invention is to provide a method performed by user equipment, and user equipment, which can reliably perform processing related to a beam failure recovery request/beam failure report (BFR) and/or scheduling request (SR). The processing related to the BFR and/or the SR may be for example, processing related to a triggered BFR and a triggered SR when an Scell is deactivated, processing of avoiding frequently triggering a plurality of BFRs on the same Scell from the time a BFR is triggered for the first time to the time a network side response is received, processing related to a BWP handover while waiting for a response transmitted by a base station on an SCell where a failure occurred, and the like.

According to a first aspect of the present invention, provided is a method performed by user equipment, the method being characterized by comprising: detecting a measurement result of a measurement reference signal corresponding to a serving cell; if the measurement result indicates that a beam failure has occurred, utilizing a counter to count the number of beam failures; and when the count value of the counter is above a given threshold, performing processing related to a beam failure recovery request/beam failure report (BFR); when the serving cell is in a deactivated state, if there is a triggered BFR associated with the serving cell, then canceling the BFR; and if there is a scheduling request (SR) triggered by a BFR associated with the serving cell, then canceling the SR.

In the above method, when the user equipment receives a Media Access Control Control Element (MAC CE) to deactivate the serving cell, the serving cell is in the deactivated state; and when a timer associated with the serving cell expires, the serving cell is in the deactivated state.

According to a second aspect of the present invention, provided is user equipment, comprising: a processor; and a memory storing instructions, where the instructions, when run by the processor, perform the foregoing method.

Effect of Invention

According to the method performed by the user equipment and the user equipment of the present invention, processing related to a beam failure recovery request/beam failure report (BFR) and/or scheduling request (SR) can be reliably performed. The processing related to the BFR and/or the SR may be for example, processing related to a triggered BFR and a triggered SR when an Scell is deactivated, processing of avoiding frequently triggering a plurality of BFRs on the same Scell from the time a BFR is triggered for the first time to the time a network side response is received, processing related to a BWP handover while waiting for a response transmitted by a base station on an SCell where a failure occurred, and the like.

BRIEF DESCRIPTION OF THE DRAWINGS

The above and other features of the present invention will be more apparent from the following detailed description in combination with the accompanying drawings, in which.

DETAILED DESCRIPTION

Figure 1:
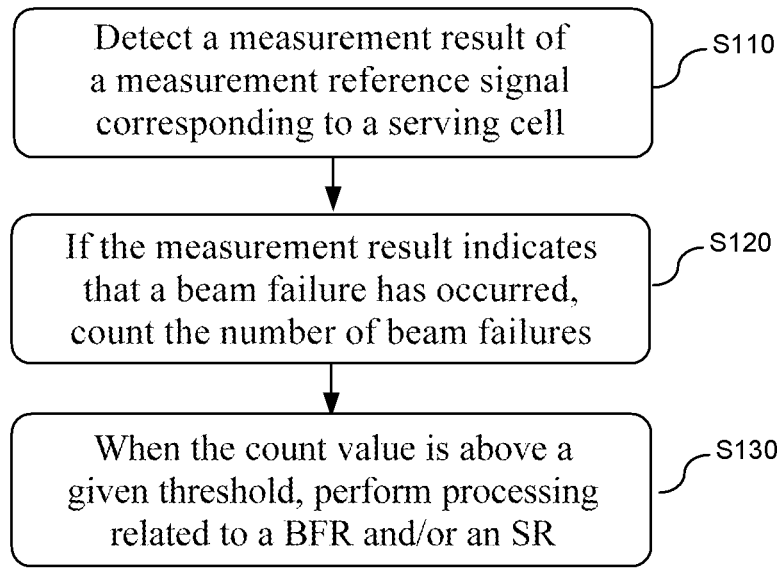
FIG. 1 shows a flowchart of a method performed by user equipment according to an embodiment of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
RLF: Radio Link Failure
NR: New Radio
LTE: Long Term Evolution
eLTE: enhanced Long Term Evolution
RRC: Radio Resource Control (layer)
MAC: Medium Access Control (layer)
MAC CE: MAC Control Element
PHY: Physical Layer
PDCCH: Physical Downlink Control Channel
RA: Random Access
PRACH: Physical Random Access Channel
SSB: Synchronization Signal Block
CSI-RS: Channel State Information Reference signal
TCI: Transmission Configuration Indicator
RSRP: Reference Signal Received Power A plurality of embodiments according to the present invention are specifically described below, with an NR mobile communications system and its subsequent evolved version serving as exemplary application environments, and with a base station and UE that support NR serving as examples. However, it should be noted that the present invention is not limited to the following embodiments, but is applicable to more other wireless communications systems, such as an eLTE communications system, and is applicable to other base stations and UE devices, such as base stations and UE devices supporting eLTE. At the same time, the present disclosure is not limited to scenarios of radio link interruption caused by beams/beam forming, but is also applicable to scenarios of radio link interruption due to other causes.

A serving cell comprises a primary cell and a secondary cell, and the serving cell mentioned in the following mainly refers to the secondary cell. Therefore, the serving cell and the secondary cell are interchangable in the following.

For an Scell that uses beam forming, once UE detects that a measurement result of a measurement reference signal corresponding to the Scell (for example, decoding error probability of a downlink control channel, or hypothetical error rate of the downlink control channel) becomes weak or exceeds a pre-configured threshold, or if measured L1-RSRP is lower than a configured threshold, a physical layer of the UE will send an indication to a MAC layer, wherein such an indication is referred to as a beam failure instance (BFI);

At the MAC layer, the UE uses a counter BFI_COUNTER to count the number of BFIs received. Each Scell that requires beam failure detection has a corresponding counter BFI_COUNTER.

Each time an indication is received, a detection timer beamFailureDetectionTimer is started or restarted, and the value of the BFI_COUNTER is increased by 1. Similarly, each Scell that requires beam failure detection has a corresponding detection timer beamFailureDetectionTimer.

When the value of the BFI_COUNTER is equal to (or exceeds) a particular value, for example, the value of the BFI_COUNTER is equal to a configured maximum value of a BFI plus one (beamFailureInstanceMaxCount+1), or the value of the BFI_COUNTER is greater than or equal to a configured maximum value of an allowed BFI, then the MAC layer would trigger a beam failure report/beam failure recovery (BFR) procedure, which is simply referred to as triggering a BFR. It essentially means that, when a condition is met (for example, the BFI_COUNTER is greater than or equal to a maximum value), the UE starts to perform operations related to a beam failure report/beam failure recovery. These operations comprise that the UE can report beam failure related information of an Scell to a network side, and can also request the beam failure recovery or request a link reconfiguration. It can be considered that when the BFI_COUNTER meets the above condition, the UE would report the beam failure related information of the Scell to the network side, and optionally request the beam failure recovery or request the link reconfiguration.

When the detection timer beamFailureDetectionTimer expires, the UE sets BFI_Counter to an initial value (for example, the initial value of BFI_COUNTER may be zero).

When the BFR is triggered, if the UE has an available uplink resource, the UE can instruct a multiplexing and assembly entity to generate a BFR MAC CE. And the generated BFR MAC CE is transmitted on the available uplink resource.

If the UE does not have available uplink resources, the UE can trigger a scheduling request, and such a scheduling request can be referred to as a scheduling request triggered by a BFR. The purpose of the scheduling request is to request the network side to allocate an available uplink resource. Once the network side allocates an available uplink resource to the UE, the UE can instruct the multiplexing and assembly entity to generate the BFR MAC CE. And the generated BFR MAC CE is transmitted on the available uplink resource.

FIG. 1 shows a flowchart of a method performed by user equipment according to an embodiment of the present invention, and as shown in FIG. 1, the method comprises step S110, step S120, and step S130.

In step S110, the UE detects a measurement result of a measurement reference signal corresponding to a serving cell. In step S120, if the measurement result indicates that a beam failure occurs, the UE utilizes a counter to count the number of beam failures. In step S130, the UE performs processing related to a beam failure recovery request/beam failure report (BFR) and/or scheduling request (SR) when the count value of the counter is above a given threshold.

According to the above method, the UE can reliably perform the processing related to the beam failure recovery request/beam failure report (BFR) and/or scheduling request (SR).

Several embodiments of the present invention are described in detail below.

In order to solve the problem of how to deal with a triggered BFR and an SR triggered by a BFR when an Scell is deactivated, the solution described in embodiment 1 or embodiment 2 can be employed.

Embodiment 1

When an Scell is deactivated, one or more of the following operations can be performed:

if there is a triggered BFR associated with the Scell, canceling the BFR;

if there is an SR triggered by a BFR associated with the Scell, or if there is a triggered SR associated with the Scell, canceling the SR;

pausing/suspending the use of configuration information related to beam failure detection; and instructing a lower layer not to perform or to stop a link evaluation related to failure detection/link recovery, wherein the lower layer is preferably a physical layer.

The aforementioned BFR associated with the Scell refers to a BFR that is triggered when there is an Scell where the value of a BFI_COUNTER belonging thereto is greater than or equal to a configured maximum value of a BFI, and then this BFR is associated with the Scell; or the aforementioned BFR refers to a BFR that is triggered by a detected beam failure on an Scell, and then this BFR is associated with this Scell where the beam failure is detected.

Herein, the meaning of a cell where a beam failure is detected or where a beam failure occurs can refer to the value of a BFI_COUNTER corresponding to the cell being greater than or equal to a configured maximum value of a BFI; and the meaning of the cell can also refer to a cell in which a BFR is triggered.

Correspondingly, the BFR associated with the Scell can trigger an SR, and then the SR can be referred to as "an SR associated with the BFR" or "an SR associated with the Scell", wherein the Scell is associated with the BFR triggering the SR.

The so-called canceling the BFR herein can mean that when the BFR is triggered, but the UE has not instructed a multiplexing and assembly entity to generate a BFR MAC CE, or when the BFR MAC CE has not been packaged into a MAC PDU, if the associated Scell is deactivated, then the UE does not need to instruct the generation of the BFR MAC CE, or does not need to transmit the already generated BFR MAC CE.

The so-called canceling the SR means that when the BFR triggers the SR, but the UE has not instructed a physical layer to transmit the SR on a PUCCH opportunity, or when a PUCCH opportunity has not arrived, if the associated Scell is deactivated, then the UE does not need to instruct to transmit the SR.

A manner of deactivating the Scell can be that:

1. an information element is carried in an RRC reconfiguration message or an RRC resume message, indicating that a state/operation corresponding to the Scell is deactivation;

2. the UE receives an SCell activation/deactivation MAC CE, indicating that the Scell is deactivated; or 3. a deactivation timer sCellDeactivationTimer associated with the SCell expires, and in this case the Scell is deactivated, wherein, when the Scell is activated, the corresponding deactivation timer sCellDeactivationTimer is started.

Embodiment 1 can be carried out after step S130 is complete, that is, when the count value of the counter is above the given threshold, the UE performs the processing related to the beam failure recovery request/beam failure report (BFR) and/or scheduling request (SR), and then, if the cell to which the counter belongs is deactivated, the operations in embodiment 1 can be performed. Or it can be considered that the solution described in embodiment 1 is contained in step S130.

Embodiment 2

On basis of embodiment 1, when an Scell is activated, if the Scell has corresponding BFR configuration information, then when the Scell is activated, one or more of the following operations can be performed:

1. triggering a beam failure detection procedure; and 2. triggering a beam failure detection and report/recovery procedure.

The beam failure detection procedure refers to the aforementioned procedure of receiving the indication of the beam failure instance from the physical layer and counting the number of the indications.

The beam failure detection and report/recovery procedure refers to the aforementioned procedure of receiving the indication of the beam failure instance from the physical layer and counting the number of the indications, and triggering the BFR when the number is greater than or equal to the configured maximum value of the BFI.

A manner of activating the Scell can be that:

1. an information element is carried in an RRC reconfiguration message or an RRC resume message, indicating that a state/operation corresponding to the Scell is activation; or 2. the UE receives an SCell activation/deactivation, indicating that the Scell is activated.

The above solution can be carried out before step S110 is performed, that is, before the UE detects the measurement result of the measurement reference signal corresponding to the serving cell, the corresponding serving cell is activated. The UE starts to perform step S110 after carrying out the above solution. Or it can be considered that the solution described in embodiment 2 is contained in step S110.

In order to avoid frequently triggering the BFR while the UE is waiting for a response on the secondary cell, the method described in embodiment 3 or 4 may be employed.

Embodiment 3

When the value of a BFI_COUNTER is greater than or equal to a configured maximum value of a BFI, if a BFR timer is not running, then the BFR is triggered. Preferably, it may be the case that the BFR timer corresponding to the secondary cell is not running. On the contrary, even if the value of the BFI_COUNTER is greater than or equal to the configured maximum value of the BFI, if the BFR timer is running, the UE would not trigger the BFR; and when the value of the BFI_COUNTER is less than the configured maximum value of the BFI, regardless of whether the BFR timer is running or not, the UE would not trigger the BFR.

The BFR timer is defined as:

a BFR timer that is started when the UE instructs a multiplexing and assembling entity to generate a BFR MAC CE. Preferably, the enabled BFR timer belongs to or corresponds to a cell corresponding to a cell ID carried in the generated BFR MAC CE.

The start time of the BFR timer may also be: starting the BFR timer of the Scell corresponding to the SR when an SR is triggered. For the Scell corresponding to the SR, reference can be made to embodiment 1.

The start time of the BFR timer may also be: when a MAC PDU is transmitted or indicated to a lower layer, the MAC PDU carries at least the BFR MAC CE, and the enabled BFR timer belongs to the cell corresponding to the cell ID carried in the BFR MAC CE.

The start time of the BFR timer may also be: when the value of the BFI_COUNTER is greater than or equal to the configured maximum value of the BFI, if the BFR timer is not running, then the BFR is triggered and the BFR timer is started.

The start time of the BFR timer may also be: starting the BFR timer when a BFR is triggered.

Then, during the running time of the BFR timer, even if the value of the BFI_COUNTER is greater than or equal to the configured maximum value of the BFI, the UE would not trigger the BFR.

When the BFR timer expires or this timer is not running, if the UE determines that the value of the BFI_COUNTER is greater than or equal to the configured maximum value of the BFI, then the UE may trigger the BFR.

Upon receiving response information by the UE from a network side, if the BFR timer is running, then the running of the BFR timer is stopped.

Here, receiving response information by the UE from the network side comprises one of the following situations:

1. the UE monitors a PDCCH on the Scell where a beam failure occurs, and receives the PDCCH. Preferably, the UE receives the PDCCH in a particular search space, and this particular search space may be a search space configured by the network side and related to a failure recovery. The so-called monitoring means that the UE receives a search space on fixed video resources and searches in the search space for whether a PDCCH scrambled by a particular RNTI is included; if there is the PDCCH scrambled by the particular RNTI, then the PDCCH is received. If there is no PDCCH scrambled by the particular RNTI, then the UE continues to perform monitoring.

2. The UE receives an indication of TCI state MAC CE. Preferably, the UE receives an indication of TCI state for UE-specific PDCCH MAC CE. In the MAC CE, an ID of the serving cell carried is the same as an ID of the serving cell where the beam failure occurred.

The specific implementation manner may be as follows:

When the UE receives the indication of TCI state MAC CE, it indicates to the lower layer, which can be a physical layer, related TCI state indication information, and the serving cell corresponding to the serving cell ID carried in the MAC CE. If the BFR timer belonging thereto is running, the BFR timer is stopped.

The above cell where the beam failure occurs refers to a cell in which the value of the BFI_COUNTER corresponding to the cell is greater than or equal to the configured maximum value of the BFI, or a cell in which the BFR is triggered.

The solution described in embodiment 3 can be carried out in step S130, that is, when the count value of the counter is above the given threshold, the UE does not directly perform the processing related to the beam failure recovery request/beam failure report (BFR) and/or scheduling request (SR). Instead, the UE performs the solution described in embodiment 3, and further determines whether the BFR timer is running, so as to perform related operations.

Embodiment 4

When the value of a BFI_COUNTER is greater than or equal to a configured maximum value of a BFI, the UE triggers the BFR, and the UE resets the value of the BFI_COUNTER to an initial value. For example, the initial value is 0.

Based on this solution, a BFR would be retriggered only when the BFI_COUNTER is again greater than or equal to the configured maximum value of the BFI, so that the BFR would not be triggered too frequently.

Another implementation of the foregoing embodiment may be as follows:

when the BFR is triggered, the UE resets the value of the BFI_COUNTER to the initial value. For example, the initial value is 0.

Another implementation of the foregoing embodiment may be as follows:

when the UE instructs a multiplexing and assembling entity to generate a BFR MAC CE, the UE resets the value of the BFI_COUNTER to the initial value. For example, the initial value is 0.

It may also be as follows:

when an SR is triggered by a BFR, the UE resets the value of the BFI_COUNTER to the initial value. For example, the initial value is 0.

It may also be as follows:

when a MAC PDU is transmitted or indicated to a lower layer, the MAC PDU carries at least the BFR MAC CE. The UE resets the value of the BFI_COUNTER to the initial value. This BFI_COUNTER belongs to or corresponds to a cell corresponding to a cell ID carried in this BFR MAC CE.

The solution described in embodiment 4 can be carried out in step S130, that is, when the count value of the counter is above the given threshold, the UE performs the processing related to the beam failure recovery request/beam failure report (BFR) and/or scheduling request (SR). In the processing, the solution described in embodiment 4 is included, that is, the value of the BFI_COUNTER is reset.

Embodiment 5

In this embodiment, step S120 is optimized, which specifically comprises:
if the measurement result indicates that the beam failure occurs, then the UE indicates a BFI to an upper layer (for example, a MAC layer); and
when receiving the BFI indication, the MAC layer determines whether a BFR timer is running:
  if the BFR timer is not running, then the value of a BFI_COUNTER is increased by 1; and
  if the BFR timer is running, then the value of the BFI_COUNTER remains unchanged, or it can be understood as not increased by 1.
For the BFR timer herein, reference can be made to the definition in embodiment 3.

Embodiment 6

Embodiment 5 can be used in combination with embodiment 4.

A specific implementation manner can be that when the value of the BFI_COUNTER is greater than or equal to the configured maximum value of the BFI, if the BFR timer is not running, then the UE triggers the BFR, and the UE resets the value of the BFI_COUNTER to the initial value, and starts the BFR timer.

When the UE receives the BFI indicated by the lower layer, since the BFR timer is running, the value of the counter BFI_COUNTER remains unchanged and can be kept as the initial value, so that a new BFR would not be triggered.

When the BFR timer is stopped or expires, as described in embodiment 3, if the UE again determines, based on the reported BFI, that the value of the BFI_COUNTER is greater than or equal to the configured maximum value of the BFI, then the UE can trigger the BFR.

The solution described in embodiment 6 can be carried out in steps S120 and S130.

A BWP refers to a Bandwidth Part. The UE may have one or more BWPs in a serving cell. When there are a plurality of BWPs, there is only one BWP that can be referred to as a default BWP. At any time, the UE only works on one BWP. This BWP is referred to as an active BWP. The active BWP can be a default BWP or a non-default BWP. If the active BWP is a non-default BWP, then when the UE is instructed to switch to the non-default BWP, the UE would start a timer bwp-InactivityTimer, and when the bwp-InactivityTimer expires, the UE would switch to a default BWP. The bwp-InactivityTimer corresponds to/belongs to the serving cell.

In order to solve the problem that the BWP handover occurs while the UE is waiting for a response, the method described in embodiment 7 or 8 may be employed.

Embodiment 7

When the BFR is triggered, if a bwp-InactivityTimer is running, then the UE stops this timer. Preferably, the UE stops the bwp-InactivityTimer related to a currently active BWP.

The above operation means that the UE will continue to camp on the currently active BWP, thereby avoiding the problem of a BWP handover.

Another implementation of the foregoing solution may be as follows:
When the value of a BFI_COUNTER is greater than or equal to a configured maximum value of a BFI, if the timer bwp-InactivityTimer is running, then the UE stops this timer.

The bwp-InactivityTimer herein belongs to the Scell where the beam failure occurs. That is, the value of the BFI_COUNTER on the Scell is greater than or equal to the configured maximum value of the BFI.

Another implementation of the foregoing solution may also be as follows:
when the UE instructs a multiplexing and assembling entity to generate a BFR MAC CE, if the timer bwp-InactivityTimer of a cell corresponding to a cell ID carried in the BFR MAC CE is running, then the UE stops this timer;

Another implementation of the foregoing solution may also be as follows:
when the SR is triggered by a BFR, if the timer bwp-InactivityTimer of the cell corresponding to the SR is running, then the UE stops this timer.

Another implementation of the foregoing solution may also be as follows:
when a MAC PDU is transmitted or indicated to a lower layer, the MAC PDU carries at least the BFR MAC CE, if the timer bwp-InactivityTimer of the cell corresponding to the cell ID carried in the BFR MAC CE is running, then the UE stops this timer.

The solution of embodiment 7 can be carried out in step S130, that is, when the count value of the counter is above the given threshold, the UE performs the processing related to the beam failure recovery request/beam failure report (BFR) and/or scheduling request (SR). In the processing, the solution described in embodiment 7 is included.

Embodiment 8

When the value of a BFI_COUNTER is greater than or equal to a configured maximum value of a BFI, the UE triggers the BFR. At this moment, the UE camps on an active BWP of the serving cell. That is, the UE performs a link evaluation on this BWP and reports a beam failure instance. This BWP can be referred to as a BWP in which a beam failure is detected. Therefore, in a BFR MAC CE generated since then, in addition to a cell ID and candidate beam information, the UE also carries BWP information. Preferably, the UE carries a BWP ID. A BWP corresponding to this BWP ID is the BWP in which the beam failure is detected by the UE.

Therefore, the BFR MAC CE carrying the BWP ID is designed in this embodiment. This BWP ID corresponds to the BWP in which the UE performs the link evaluation and detects the beam failure.

When a base station receives the BFR MAC CE, if it is determined that the UE has undergone a BWP handover, and the BWP after the handover is different from the BWP in the BFR MAC CE, then the information may not be processed because the information provided by the UE is based on the BWP before the handover, and there is no reference value for the BWP after the handover; if it is determined that the UE does not have the BWP handover, the base station can transmit a response message to the UE (for example, the base station transmits a PDCCH in the BWP corresponding to the BWP ID reported by the UE) based on this information, particularly the BWP information in this information, or based on the TCI status indication transmitted to the UE in the BWP corresponding to the BWP ID.

The solution described in embodiment 8 can be carried out in step S130, that is, when the count value of the counter is above the given threshold, the UE performs the processing related to the beam failure recovery request/beam failure report (BFR) and/or scheduling request (SR). In the processing, the solution described in embodiment 8 is included.

Figure 2:
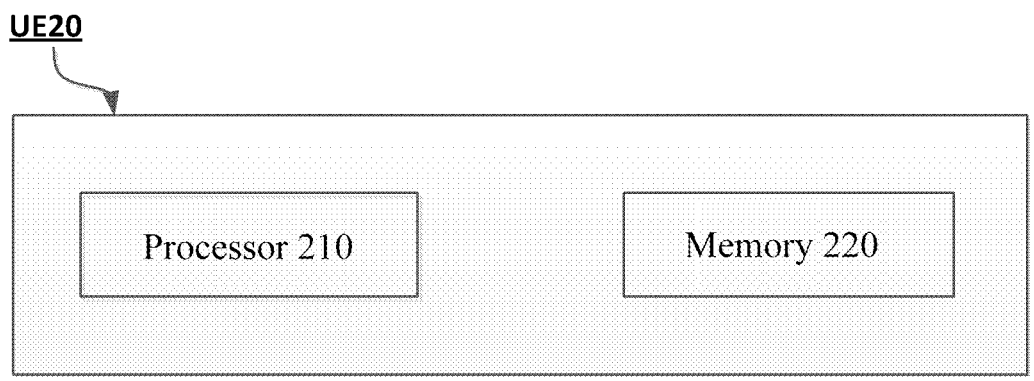
FIG. 2 shows a block diagram of user equipment according to an embodiment of the present invention.

FIG. 2 shows a block diagram of user equipment UE 20 according to an embodiment of the present invention. As shown in FIG. 2, the UE 20 includes a processor 210 and a memory 220. The processor 210 may include, for example, a microprocessor, a microcontroller, an embedded processor, and the like. The memory 220 may include, for example, a volatile memory (such as a random access memory (RAM)), a hard disk drive (HDD), a non-volatile memory (such as a flash memory), or other memories. The memory 220 stores program instructions. The instructions, when run by the processor 210, can perform the aforementioned method in the user equipment described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as UE devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment (UE), comprising:
a processor; and
a memory in electronic communication with the processor, wherein instructions stored in the memory are executable to:
cause a Medium Access Control (MAC) layer of the UE to receive, from a physical layer of the UE, a beam failure instance indication for a Secondary Cell (SCell);
increment a value of a counter by 1 for the SCell when the beam failure instance indication is received for the SCell;
compare the value of the counter for the SCell with a threshold;
trigger a Beam Failure Recovery (BFR) for the SCell when the value of the counter for the SCell is equal to or larger than the threshold; and
when the UE receives, from a base station, a MAC Control Element (CE) for deactivating the SCell or when a timer associated with the SCell expires,
deactivate the SCell, and
cancel the triggered BFR for the SCell when the SCell is deactivated.

2. The UE according to claim 1, wherein
in a case that a Scheduling Request (SR) was triggered by the BFR of the SCell and the SCell is deactivated, the UE cancels the SR.

3. A method performed by a user equipment (UE), the method comprising:
causing a Medium Access Control (MAC) layer of the UE to receive, from a physical layer of the UE, a beam failure instance indication for a Secondary Cell (SCell);
incrementing a value of a counter by 1 for the SCell when the beam failure instance indication is received for the SCell;
comparing the value of the counter for the SCell with a threshold; and
triggering a Beam Failure Recovery (BFR) for the SCell when the value of the counter for the SCell is equal to or larger than the threshold,
when the UE receives, from a base station, a MAC Control Element (CE) for deactivating the SCell or when a timer associated with the SCell expires, the method further comprising:

deactivating the SCell; and cancelling the triggered BFR for the SCell when the SCell is deactivated.

* * * * *